US012027087B2

(12) United States Patent
Sharma et al.

(10) Patent No.: US 12,027,087 B2
(45) Date of Patent: Jul. 2, 2024

(54) SMART COMPOSITOR MODULE

(71) Applicant: QUALCOMM Incorporated, San Diego, CA (US)

(72) Inventors: Rahul Sharma, Bangalore (IN); Krishna Kishor Jha, Bangalore (IN); Deepak Muddegowda, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/663,327

(22) Filed: May 13, 2022

(65) Prior Publication Data

US 2023/0368714 A1 Nov. 16, 2023

(51) Int. Cl.
*G09G 3/20* (2006.01)

(52) U.S. Cl.
CPC .......... *G09G 3/20* (2013.01); *G09G 2360/08* (2013.01); *G09G 2360/18* (2013.01)

(58) Field of Classification Search
CPC ... G09G 3/20; G09G 2360/08; G09G 2360/18
See application file for complete search history.

(56) References Cited

U.S. PATENT DOCUMENTS

| | | | | |
|---|---|---|---|---|
| 2015/0100884 | A1* | 4/2015 | Ryu | G09G 5/14 715/790 |
| 2017/0094268 | A1* | 3/2017 | Gulati | G09G 5/39 |
| 2018/0189922 | A1 | 7/2018 | Chinnadurai et al. | |
| 2018/0293183 | A1* | 10/2018 | Cooray | G06F 12/1036 |
| 2019/0378478 | A1* | 12/2019 | Moreira | G09G 5/397 |
| 2022/0415282 | A1* | 12/2022 | Li | G09G 5/006 |

OTHER PUBLICATIONS

International Search Report and Written Opinion—PCT/US2023/019937—ISA/EPO—dated Jul. 14, 2023.

* cited by examiner

*Primary Examiner* — Terrell M Robinson
(74) *Attorney, Agent, or Firm* — Procopio, Cory, Hargreaves & Savitch

(57) ABSTRACT

This disclosure provides systems, devices, apparatus, and methods, including computer programs encoded on storage media, for a smart compositor module. A display processor may obtain a plurality of layers associated with at least one frame in a scene. The display processor may identify a composition capability of a first portion of at least one DPU and a second portion of the at least one DPU. The display processor may allocate at least one first layer of the plurality of layers to the first portion of the at least one DPU and at least one second layer of the plurality of layers to the second portion of the at least one DPU. The display processor may compose the at least one first layer at the first portion of the at least one DPU and the at least one second layer at the second portion of the at least one DPU.

30 Claims, 8 Drawing Sheets

SMART COMPOSITOR MODULE

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address inefficient use of display processing unit (DPU) resources where the GPU is used for composition of some layers while some DPU resources are left unused. There is a need for improved utilization of DPU resources.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may obtain a plurality of layers associated with at least one frame in a scene. The apparatus may identify a composition capability of a first portion of at least one DPU and a second portion of the at least one DPU. The apparatus may allocate at least one first layer of the plurality of layers to the first portion of the at least one DPU and at least one second layer of the plurality of layers to the second portion of the at least one DPU. The at least one first layer and the at least one second layer may be allocated based on the composition capability of the first portion and the second portion. The apparatus may compose the at least one first layer at the first portion of the at least one DPU and the at least one second layer at the second portion of the at least one DPU.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
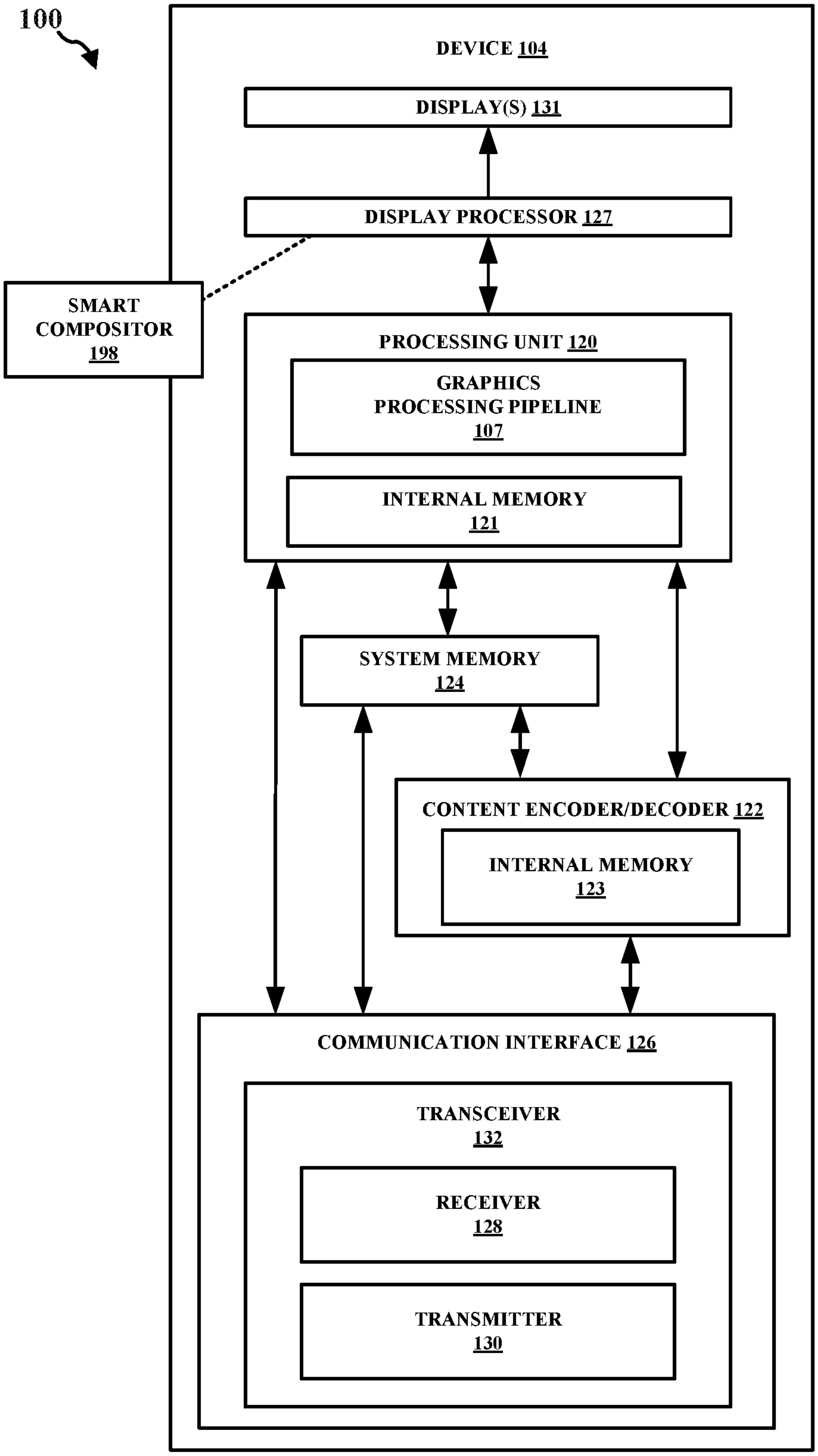
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SoCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

The automotive industry has explored various display use cases in a vehicle. The list of display use cases or features may be growing rapidly, which may make the display topology more complex in the system. It may be likely that there would be a surge in the composition request that may push the DPU to its composition capacity. Further, a DPU chip/SoC may include two (or more) DPU hardware instances with differences in the display interface controllers and/or the physical hardware.

In one or more aspects, one of the DPUs not being used to drive the physical display interface may be used as a composition device to compose the layers and feed back to the other DPU driving the physical display panel. One or more aspects may relate to a smart compositor, which may be a module that utilizes a device with composition capability and sends back the composed buffer to the client of the smart compositor.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of other components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a smart compositor 198 configured to obtain a plurality of layers associated with at least one frame in a scene. The smart compositor 198 may be configured to identify a composition capability of a first portion of at least one DPU and a second portion of the at least one DPU. The smart compositor 198 may be configured to allocate at least one first layer of the plurality of layers to the first portion of the at least one DPU and at least one second layer of the plurality of layers to the second portion of the at least one DPU. The at least one first layer and the at least one second layer may be allocated based on the composition capability of the first portion and the second portion. The smart compositor 198 may be configured to compose the at least one first layer at the first portion of the at least one DPU and the at least one second layer at the second portion of the at least one DPU. Although the following description may be focused on display processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
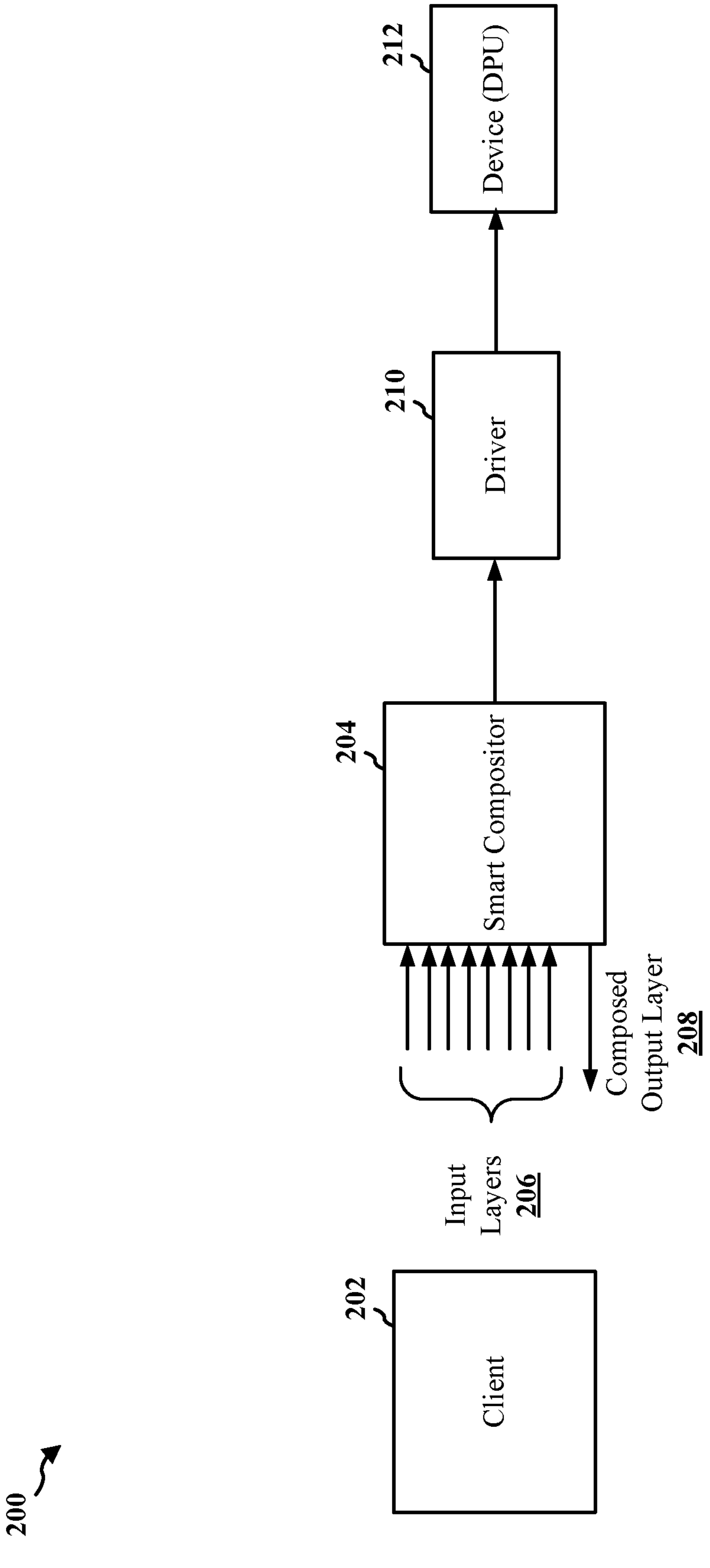
FIG. 2 is a block diagram illustrating an example smart compositor as a service according to one or more aspects.

FIG. 2 is a block diagram 200 illustrating an example smart compositor as a service according to one or more aspects. A smart compositor 204 may be a module that utilizes a device 212 with composition capability to compose one or more layers of a scene. In one or more configurations, the device 212 may be at least one DPU. The smart compositor 204 may receive one or more input layers from the client 202 of the smart compositor. Further, smart compositor 204 may communicate with the device via a driver 210. Once the layers are composed at the device 212, the smart compositor 204 may send back the composed output layer 208 stored in a composed buffer to the client 202 of the smart compositor.

In one or more configurations, in order to use the device/DPU 212 as a composition device, all the input layers 206 to the smart compositor 204 may be composed by a write-back hardware module of the device/DPU 212, and written to a memory location. The primary DPU pipeline may fetch the composed image written in the memory to render on the physical display connected to the interface of the device/DPU 212.

Figure 3:
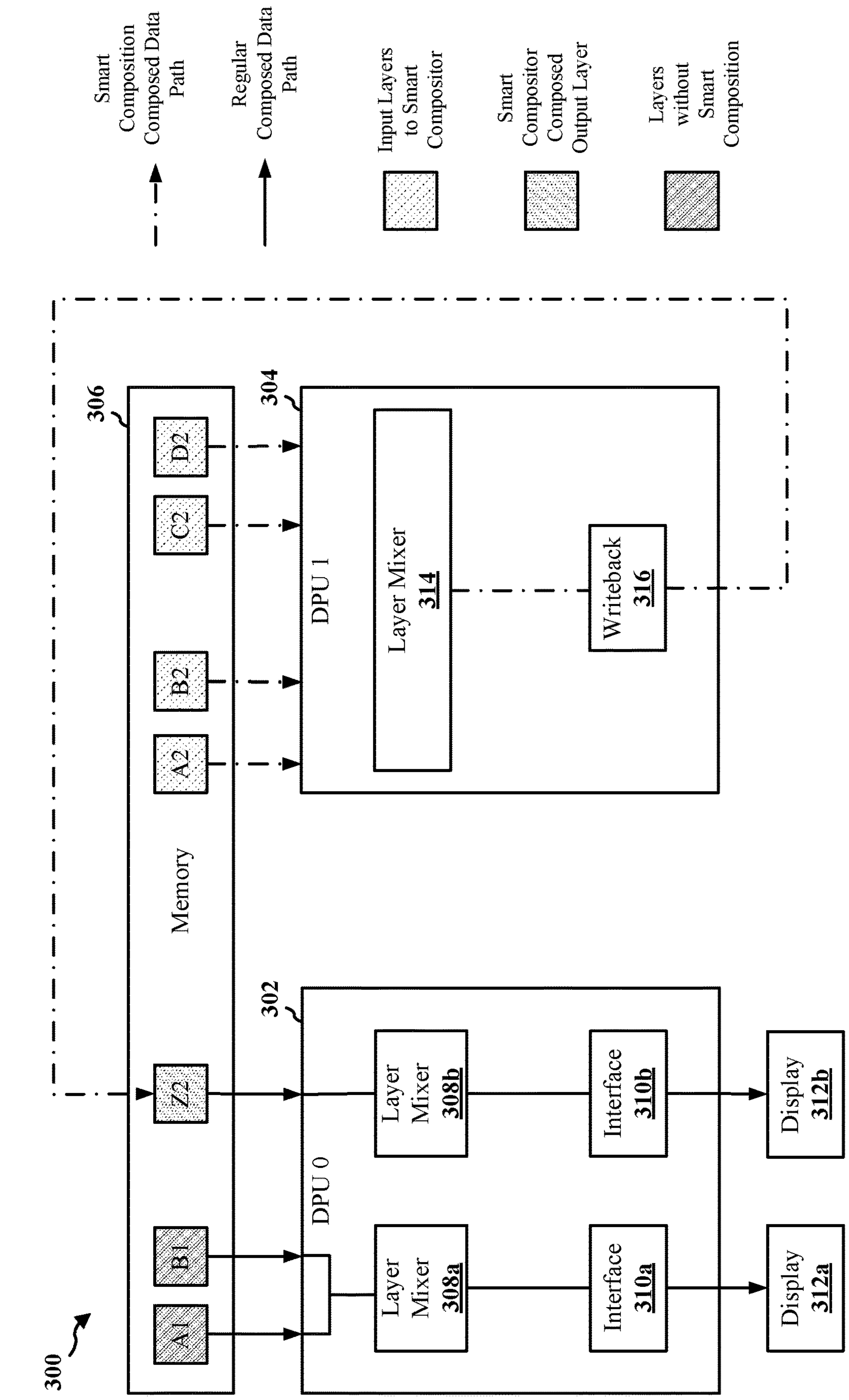
FIG. 3 is a block diagram illustrating the operation of a smart compositor in connection with a DPU according to one or more aspects.

FIG. 3 is a block diagram 300 illustrating the operation of a smart compositor in connection with a DPU according to one or more aspects. For regular composition without involvement of the smart compositor, a source surface processor pipe (SSPP) of the DPU 0 302 may fetch layers (a layer may represent a frame buffer in the memory; layers may also be referred to as surfaces) A1 and B1 from the memory 306, and may send the layers A1 and B1 to the layer mixer 308*a*. The layer mixer 308*a* may then send the composed layer based on the layers A1 and B1 to the display 312*a* over the physical display interface 310*a* of the DPU 0 302.

Further, for composition with a smart compositor, the DPU 1 304 may be used as a composition device. Under the direction of the smart compositor, the SSPPs of the DPU 1 304 may fetch the layers A2, B2, C2, and D2. Then, the layer mixer 314 of the DPU 1 304 may compose the layers A2, B2, C2, and D2, and may output a layer Z2. Next, the writeback block 316 of the DPU 1 304 may write the composed output layer Z2 back to the memory 306. Thereafter, the SSPP of the DPU 0 302 may fetch the composed layer Z2 from the memory 306, and may send the composed layer Z2 to the layer mixer 308*b*, which may further send the composed layer Z2 to the display 312*b* over the physical display interface 310*b* of the DPU 0 302. In some examples, the memory 306 may be a double data rate (DDR) memory. In some examples, the DPU 0 302 may also include a write-back block.

In one or more examples, there may be more layers than can be composed at a single DPU. For example, a single DPU may have 8 SSPPs, which may be insufficient to compose 12 layers. Accordingly, without the use of the smart compositor, a fallback to the GPU for the composition of the remaining 4 layers may be performed. The fallback to the GPU may be associated with additional power consumption.

In one configuration, with the smart compositor and a DPU chip/SoC including two DPUs (i.e., a DPU 0 and a DPU 1), all the layers (e.g., 12 layers) may be composed by the two DPUs. For example, 6 SSPPs each from the two DPUs may be used to compose the 12 layers. Accordingly, falling back to the GPU for composition may be avoided. Avoiding the fallback to the GPU may not just help in reducing power consumption, but also improve the user experience.

In one or more examples, a client may opt to have all layers composed by the smart compositor. The smart compositor may submit the final composed buffer to a display server (e.g., an open WIFI-display (OpenWFD) server) for rendering on the display panel.

In one or more examples, a client may choose to compose all the layers through the smart compositor. The smart compositor may write the frame including the composed layers back to the memory. Further, an external module (e.g., an encoder) may fetch the frame from the memory and may further process the frame.

Figure 4:
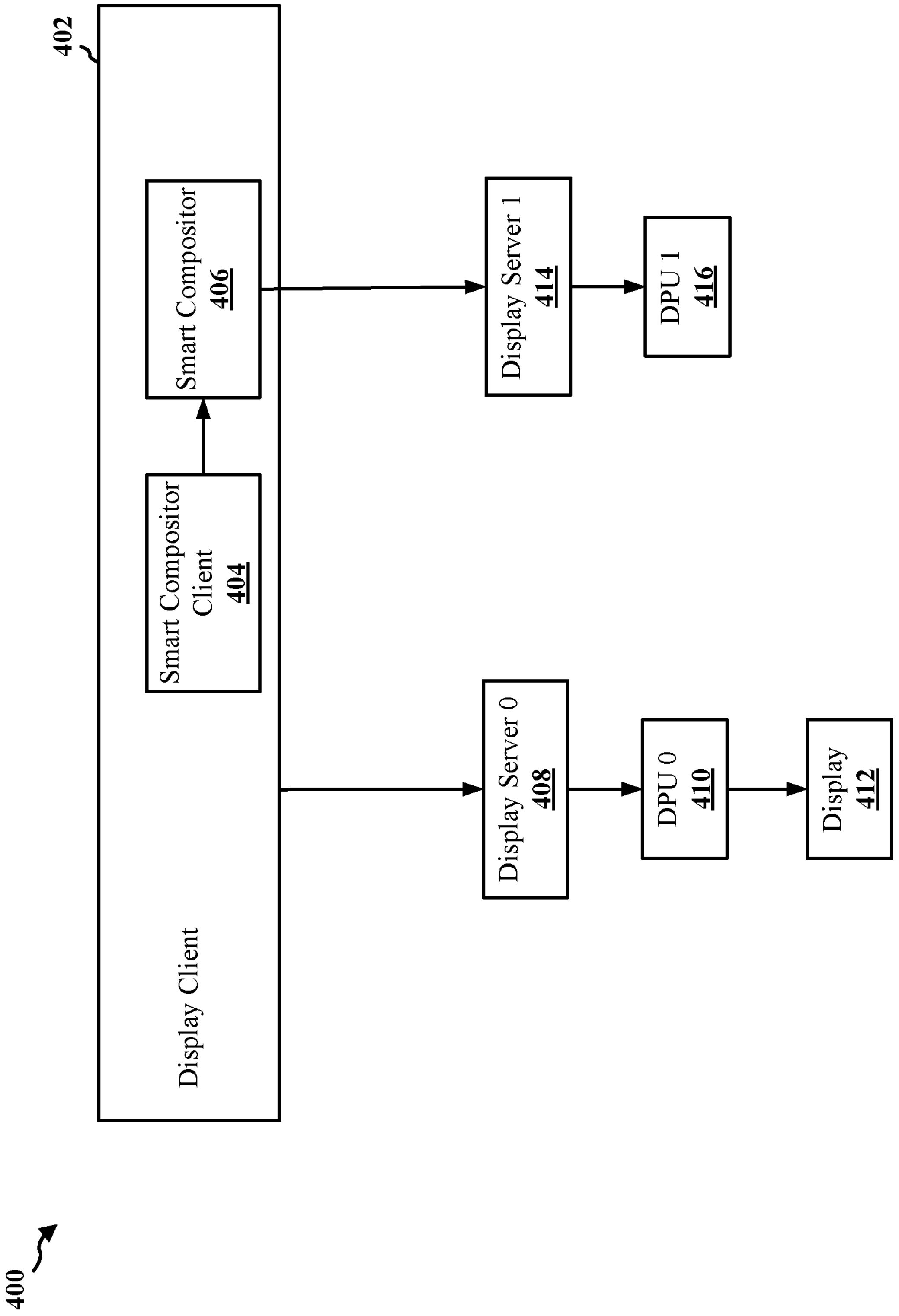
FIG. 4 is a block diagram illustrating an example smart compositor framework according to one or more aspects.

FIG. 4 is a block diagram 400 illustrating an example smart compositor framework according to one or more aspects. The smart compositor feature may enable the composition of layers using devices with composition capability. A device with composition capability may refer to a hardware block (e.g., a GPU or a DPU) that is capable of blending two or more frame buffers into a single frame output. In some configurations, the devices with composition capability may include at least one DPU. In some additional configurations, the devices with composition capability may further include one or more GPUs.

The smart compositor 406 may work together with a smart compositor client 404 to achieve the composition functionality using a composition device (e.g., the DPU 1 416 and/or the DPU 0 410). Both the smart compositor 406 and the smart compositor client 404 may reside in a display client 402. In one configuration, the smart compositor 406 may be an independent module that may communicate with the DPU 1 416 (which may be the composition device) via a display server 1 414.

In one or more configurations, the smart compositor client 404 may submit the input layer/surface buffers and an output buffer to the smart compositor 406. The request may be processed by the smart compositor 406, which may pass the details regarding all the input buffers and the output buffer to the DPU 1 416. The DPU 1 416 may write the composed image frame to the output buffer. Once the composition is completed, the call may return with a status and the output buffer.

Accordingly, once the smart compositor client 404 receives the composed output buffer, the composed output buffer may be sent to the display panel 412 for rendering via the display server 0 408 and the DPU 0 410.

Therefore, in one or more examples, the smart compositor may increase the composition capability of a DPU chip/SoC including two DPUs (DPU instances) by utilizing the hardware resources of the second DPU. As described above, the second DPU may be used as a composition device. In one or more configurations, the physical display interface of the second DPU may not be enabled. Because the smart compositor may increase the number of layers that may be composed by the DPU(s), the smart compositor may reduce the usage of the GPU for composition, thereby reducing the overall power consumption for a given use case. The number of layers that may be composed by the DPU(s) with the use of the smart compositor may depend on the throughput of the DPU(s), where the higher the DPU clock rate, the higher the throughput. Additional factors that may affect the number of layers that may be composed may be the size of the input buffers and the refresh rate of the display. The smaller the size of the input buffers, the higher the number of layers that may be composed. Further, the lower the refresh rate of the display, the higher the number of layers that may be composed. In some additional examples, the DPU chip/SoC may include more than two DPUs (DPU instances), and the composition capability of the DPU chip/SoC may be further increased with the smart compositor by utilizing yet additional DPUs in the DPU chip/SoC. The number of DPUs (DPU instances) in the DPU chip/SoC may not limit the disclosure.

In one or more examples, two display server processes including the display server 0 408 and the display server 1 414 may be used to control and configure the two DPUs 410 and 416, respectively. Herein the physical display interface of the DPU 0 410 may be active, and the DPU 0 410 may be referred to as a regular DPU. Further, the physical display interface of the DPU 1 416 may be inactive, and the DPU 1 416 may be used as a composition device by the smart compositor 406. Accordingly, the DPU 1 416 may be referred to as a composition DPU.

When the display server 0 408 starts for the DPU 0 410, during the initialization, the display server 0 408 may parse the pipelines assigned to all ports for each client. Virtual pipelines may be assigned for the ports (e.g., the WIFI-Display (WFD) ports). Further, a physical pipeline of the DPU 0 410 may be marked as hidden. The hidden physical pipeline may be used to consume the composed buffer to which the output of the composition DPU may be written.

When a display client (e.g., a WFD client) of a regular DPU executes the application programming interfaces (APIs) (e.g., WFD APIs), during the execution, the smart compositor client 404 may aggregate the list of input layers using the virtual pipeline. Upon a commit, the smart compositor client 404 may pass the input layers on to the smart compositor 406 for composition. Once the composition is completed, the smart compositor client 404 may bind the output layer buffer to the hidden physical pipeline of the DPU 0 410 and may perform a device commit on the display panel 412.

The DPU 1 416 (i.e., the composition DPU) may have a single writeback port configured. All the physical pipelines of the DPU 1 416 may be assigned to the writeback port. Upon receiving the composition request, the smart compositor 406 may communicate with the display server 1 414 of the DPU 1 416 via calls (e.g., WFD calls). In particular, input buffers may be bound to the physical SSPP of the DPU 1 416, and pipelines may be bound to the writeback display port of the DPU 1 416. Further, the output buffer may be programmed as the destination buffer of the writeback display port. When the writeback commit is completed, an interrupt may be generated and received, upon which the commit call may return to the smart compositor 406. Upon completion of the commit, the smart compositor 406 may return the call back to the smart compositor client 404 that queued the buffers for composition.

Figure 5:
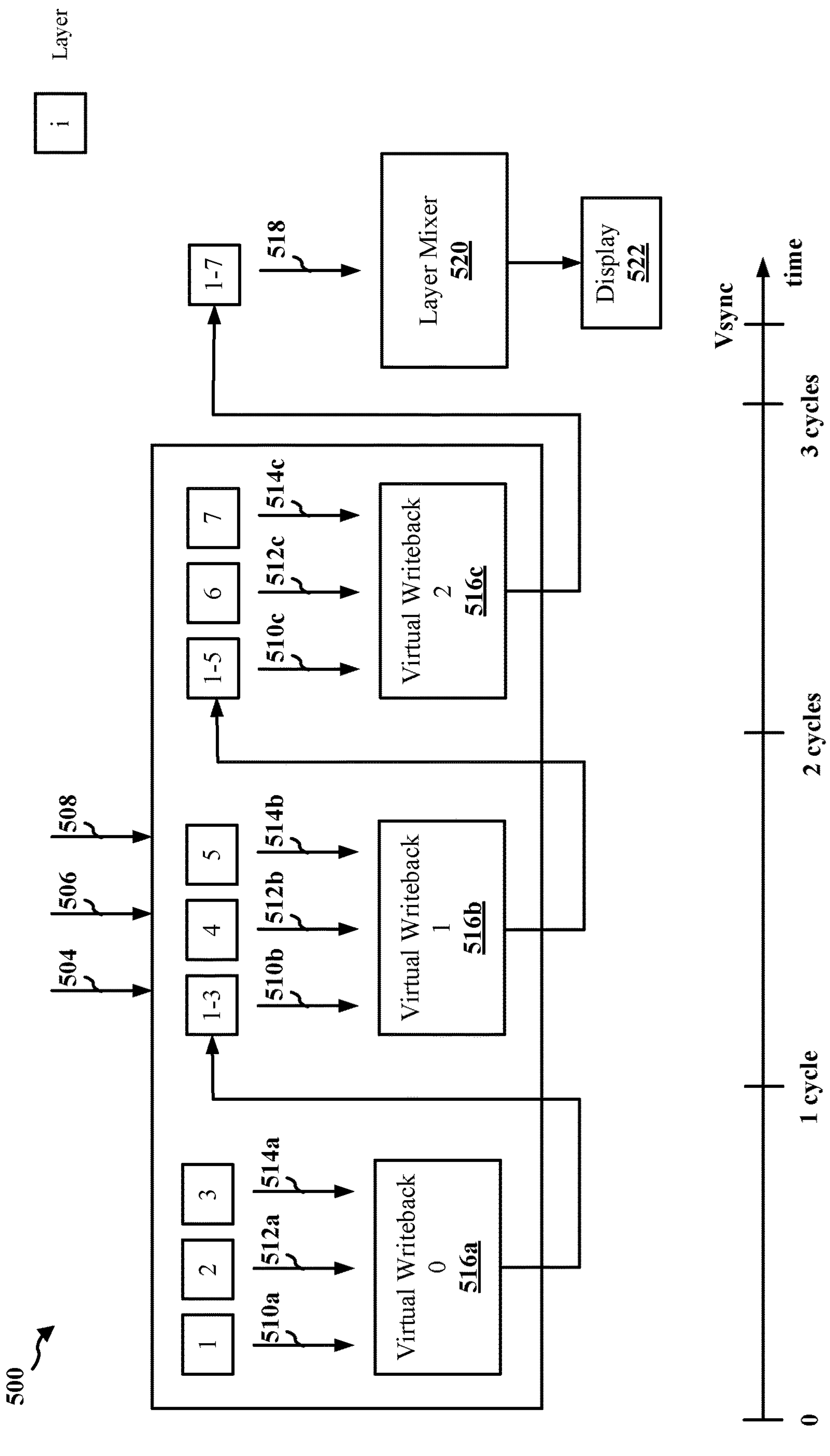
FIG. 5 is a diagram illustrating example time multiplexed layer composition according to one or more aspects.

FIG. 5 is a diagram 500 illustrating example time multiplexed layer composition according to one or more aspects. In one or more configurations, depending on the resolution (e.g., 1920×1080 pixels) and the refresh rate (e.g., 60 Hz) of the display and the clock rate of the DPU (e.g., 124 MHz), there may be enough time during a vertical synchronization ($V_{sync}$ or Vsync) period (the vertical synchronization may be a period in which a frame may be transmitted completely to a display panel) for the DPU to perform multiple cycles of composition. Therefore, by virtualizing the composition pipelines, the number of layers that may be composed by the DPU for each $V_{sync}$ period may be increased. For example, as shown in FIG. 5, with pipeline virtualization, 7 layers may be composed within a $V_{sync}$ period by the same DPU that has 3 physical pipelines 504, 506, and 508. In particular, 3 cycles of composition may be performed during the $V_{sync}$ period. During the first cycle, layers 1 through 3 may be inputted via virtual pipelines 510*a*, 512*a*, and 514*a*, and may be composed. The output at the end of the first cycle may be fed back via the virtual pipeline 510*b* by the virtual writeback block 0 516*a* for composition during the second cycle together with layers 4 and 5 inputted via virtual pipelines 512*b* and 514*b*. Similarly, the output at the end of the second cycle, which may include composed layers 1 through 5, may be fed back via the virtual pipeline 510*c* by the virtual writeback block 1 516*b* for composition during the third cycle together with layers 6 and 7 inputted via virtual pipelines 512*c* and 514*c*. Next, the output at the end of the third cycle, which may include composed layers 1 through 7, may be inputted into the layer mixer 520 via the physical pipeline 518 by the virtual writeback block 2 516*c*. Thereafter, the layer mixer 520 may output the composed frame including composed layers 1 through 7 to the display 522.

In additional configurations, more than one layer mixer may be provided, and correspondingly more than one display may be supported. The virtual pipelines and the virtual writeback blocks may be suitably configured to support the multiple layer mixers and the multiple display panels.

In one or more configurations, one dedicated SSPP may be used for each display node (e.g., a display panel). Later in the DPU pipelines, frames from two (or more) SSPPs may be blended in a single layer mixer and sent to the display via the display interface.

In one or more additional configurations, with the virtual pipeline, a single SSPP may be used to support multiple display nodes (e.g., multiple display panels). In particular, blending of the display frames may be performed in the virtualized writeback modules. The final frame buffer including frames for all the display nodes (e.g., 2 display nodes: display node 1 and display node 2) may be sent to the layer mixers, which may further send the frames to the displays. In particular, a frame for one display node may be sent to the respective layer mixer by a respective virtual writeback block during a respective cycle. Accordingly, multiple display nodes may be supported via a single SSPP.

Figure 6:
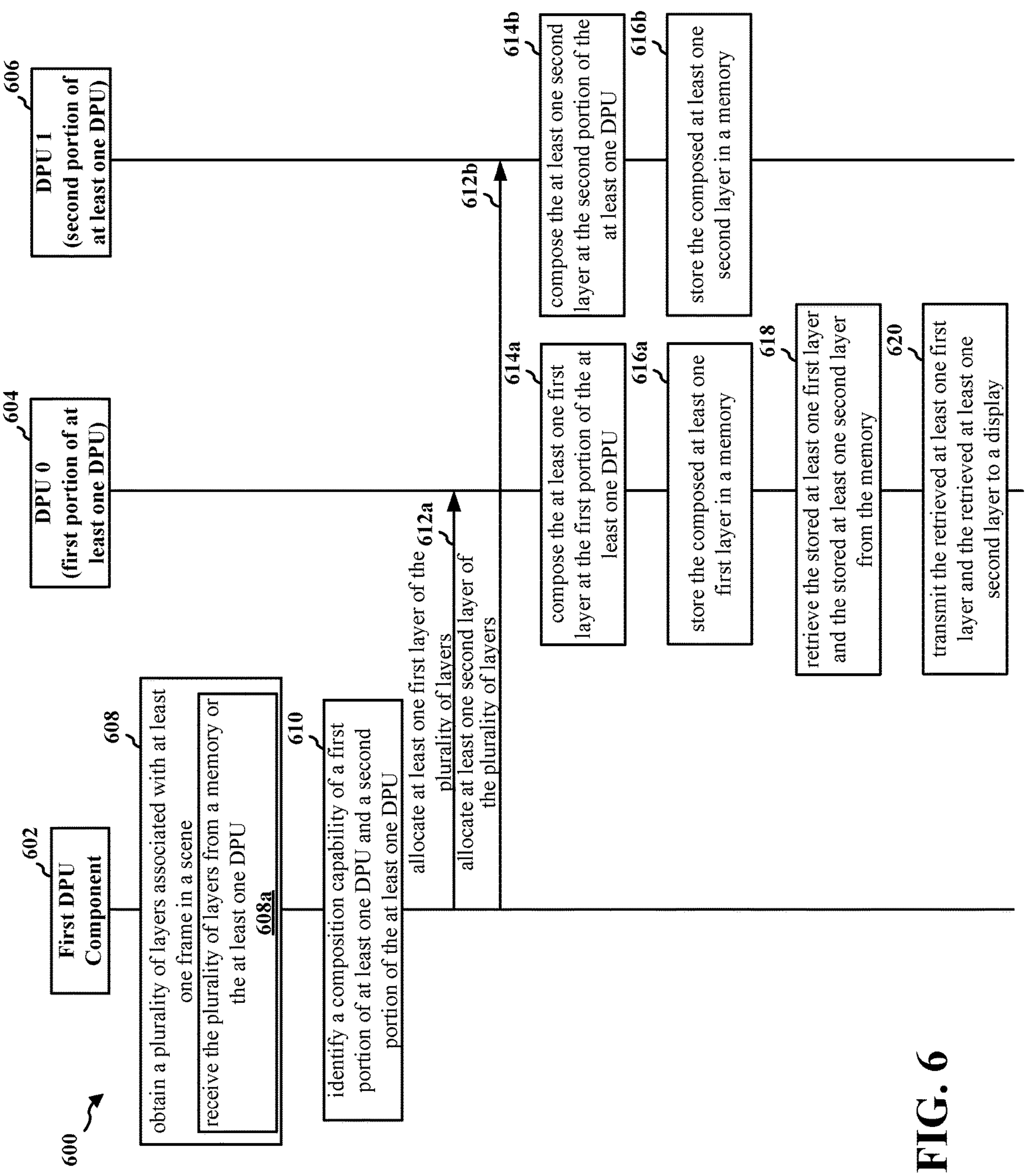
FIG. 6 is a call flow diagram illustrating example communications between a CPU, a DPU 0, and a DPU 1 in accordance with one or more techniques of this disclosure.

FIG. 6 is a call flow diagram 600 illustrating example communications between a first DPU component 602 (e.g., an entity such as a WFD client, which may interact with the client, process requests, and pass the requests to DPU 0 604 or DPU 1 606), a DPU 0 604, and a DPU 1 606 in accordance with one or more techniques of this disclosure. Herein the DPU 0 604 may also be referred to as a first portion 604 of at least one DPU (e.g., the DPU 0/first portion 604 may be a source surface processor pipes (SSPP) subblock within a DPU package). Further, the DPU 1 606 may also be referred to as a second portion 606 of the at least one DPU (e.g., the DPU 1/second portion 606 may be another SSPP subblock within the DPU package).

At 608, the first DPU component 602 may obtain a plurality of layers associated with at least one frame in a scene.

At 608*a*, to obtain the plurality of layers, the first DPU component 602 may receive the plurality of layers from a memory or the at least one DPU. In one configuration, the memory may be a DDR memory.

At 610, the first DPU component 602 may identify a composition capability of a first portion 604 of at least one DPU and a second portion 606 of the at least one DPU.

In one configuration, the at least one DPU may include at least two DPUs.

At 612*a*, the first DPU component 602 may allocate at least one first layer of the plurality of layers to the first portion 604 of the at least one DPU.

At 612*b*, the first DPU component 602 may allocate at least one second layer of the plurality of layers to the second portion 606 of the at least one DPU.

In one configuration, the at least one first layer may correspond to a first batch of layers (a batch of layers may refer to multiple frame buffers that may be provided to the smart compositor for composition). The at least one second layer may correspond to a second batch of layers.

At 614*a*, the first portion 604 of the at least one DPU may compose (i.e., blend layers or frame buffers) the at least one first layer.

At 614*b*, the second portion 606 of the at least one DPU may compose the at least one second layer.

In one configuration, the at least one first layer and the at least one second layer may be composed within a $V_{sync}$ period. In one configuration, the at least one first layer or the at least one second layer may be composed by a writeback hardware block (the writeback hardware block may save blended buffers to the memory) in the at least one DPU.

At 616*a*, the first portion 604 of the at least one DPU may store the composed at least one first layer in a memory.

At 616*b*, the second portion 606 of the at least one DPU may store the composed at least one second layer in a memory.

In one configuration, the composed at least one first layer and the composed at least one second layer may be stored in a writeback buffer of the memory.

At 618, the first portion 604 of the at least one DPU may retrieve the stored at least one first layer and the stored at least one second layer from the memory.

At 620, the first portion 604 of the at least one DPU may transmit the retrieved at least one first layer and the retrieved at least one second layer to a display.

In one configuration, a first display interface of the first portion of the at least one DPU may be enabled. A second display interface of the second portion of the at least one DPU may be disabled.

Figure 7:
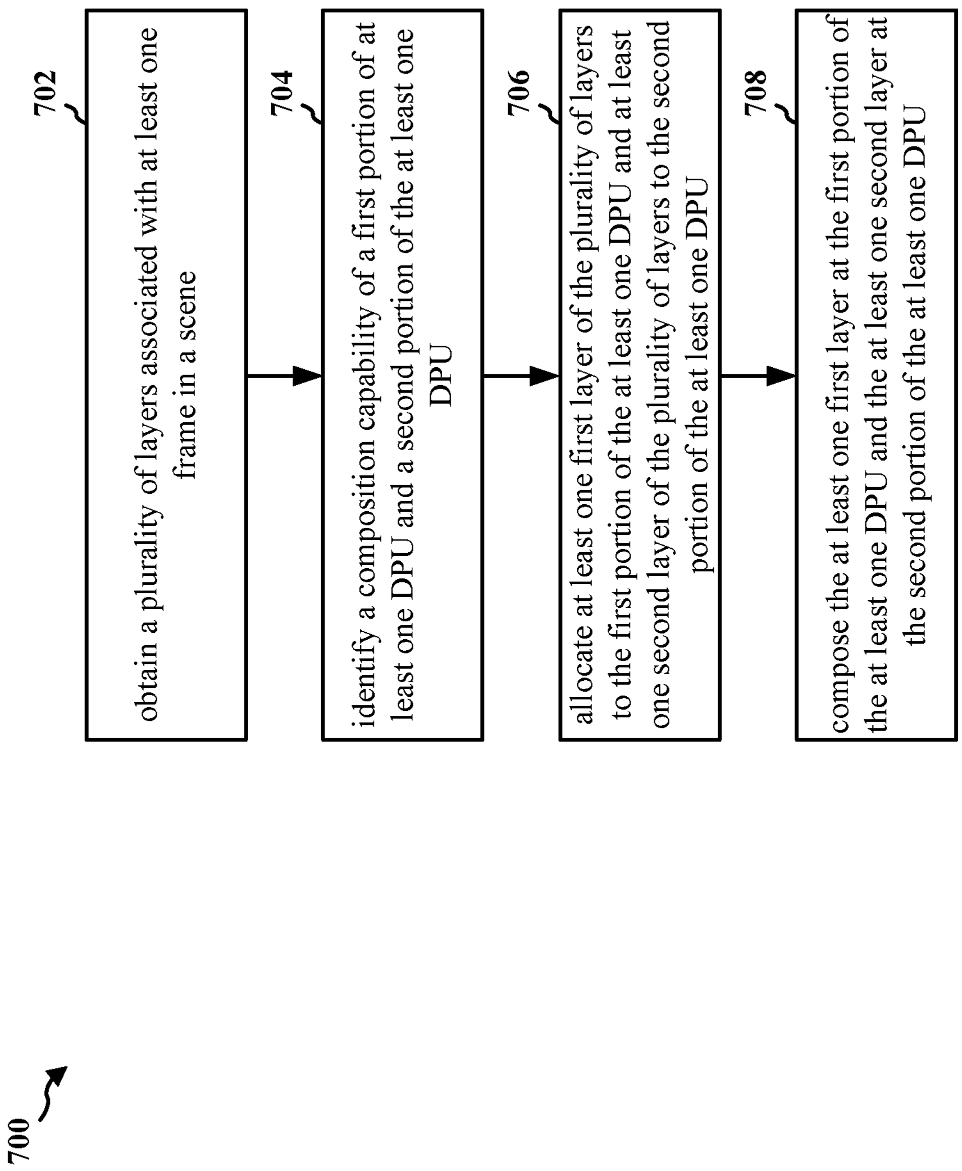
FIG. 7 is a flowchart of an example method of display processing in accordance with one or more techniques of this disclosure.

FIG. 7 is a flowchart 700 of an example method of display processing in accordance with one or more techniques of this disclosure. The method may be performed by an apparatus, such as an apparatus for display processing, a display processing unit (DPU) or other display processor, a wireless communication device, and the like, as used in connection with the aspects of FIGS. 1-6.

At 702, the apparatus may obtain a plurality of layers associated with at least one frame in a scene. For example, referring to FIG. 6, at 608, the first DPU component 602 may obtain a plurality of layers associated with at least one frame in a scene. Further, 702 may be performed by the display processor 127.

At 704, the apparatus may identify a composition capability of a first portion of at least one DPU and a second portion of the at least one DPU. For example, referring to FIG. 6, at 610, the first DPU component 602 may identify a composition capability of a first portion 604 of at least one DPU and a second portion 606 of the at least one DPU. Further, 704 may be performed by the display processor 127.

At 706, the apparatus may allocate at least one first layer of the plurality of layers to the first portion of the at least one DPU and at least one second layer of the plurality of layers to the second portion of the at least one DPU. The at least one first layer and the at least one second layer may be allocated based on the composition capability of the first portion and the second portion. For example, referring to FIGS. 6, at 612*a* and 612*b*, the first DPU component 602 may allocate at least one first layer of the plurality of layers to the first portion 604 of the at least one DPU and at least one second layer of the plurality of layers to the second portion 606 of the at least one DPU. Further, 706 may be performed by the display processor 127.

At 708, the apparatus may compose the at least one first layer at the first portion of the at least one DPU and the at least one second layer at the second portion of the at least one DPU. For example, referring to FIGS. 6, at 614*a* and 614*b*, the first portion 604 of the at least one DPU may compose the at least one first layer and the second portion 606 of the at least one DPU may compose the at least one second layer. Further, 708 may be performed by the display processor 127.

Figure 8:
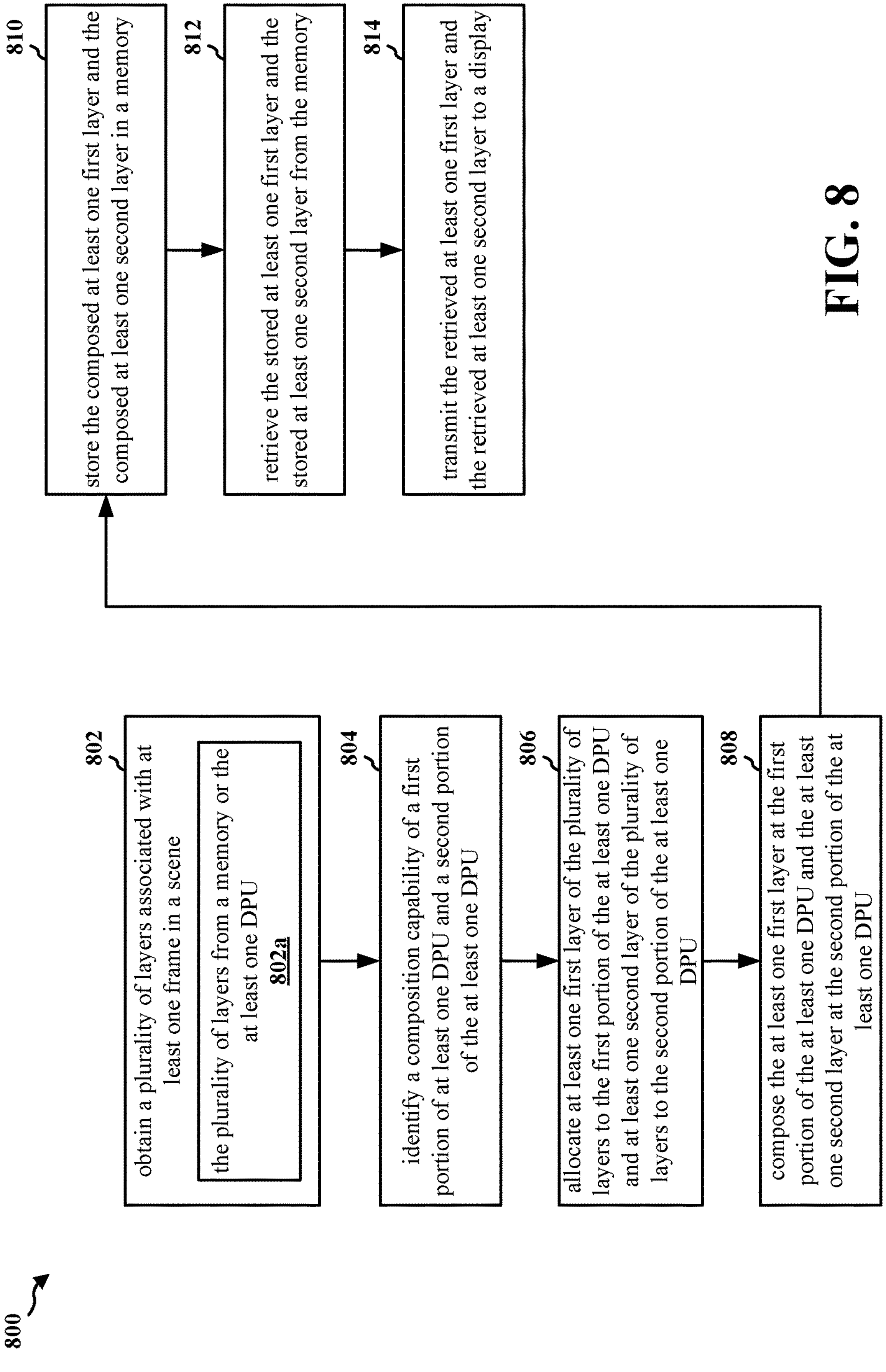
FIG. 8 is a flowchart of an example method of display processing in accordance with one or more techniques of this disclosure.

FIG. 8 is a flowchart 800 of an example method of display processing in accordance with one or more techniques of this disclosure. The method may be performed by an apparatus, such as an apparatus for display processing, a display processing unit (DPU) or other display processor, a wireless communication device, and the like, as used in connection with the aspects of FIGS. 1-6.

At 802, the apparatus may obtain a plurality of layers associated with at least one frame in a scene. For example, referring to FIG. 6, at 608, the first DPU component 602 may obtain a plurality of layers associated with at least one frame in a scene. Further, 802 may be performed by the display processor 127.

At 804, the apparatus may identify a composition capability of a first portion of at least one DPU and a second portion of the at least one DPU. For example, referring to FIG. 6, at 610, the first DPU component 602 may identify a composition capability of a first portion 604 of at least one DPU and a second portion 606 of the at least one DPU. Further, 804 may be performed by the display processor 127.

At 806, the apparatus may allocate at least one first layer of the plurality of layers to the first portion of the at least one DPU and at least one second layer of the plurality of layers to the second portion of the at least one DPU. The at least one first layer and the at least one second layer may be allocated based on the composition capability of the first portion and the second portion. For example, referring to FIGS. 6, at 612*a* and 612*b*, the first DPU component 602 may allocate at least one first layer of the plurality of layers to the first portion 604 of the at least one DPU and at least one second layer of the plurality of layers to the second portion 606 of the at least one DPU. Further, 806 may be performed by the display processor 127.

At 808, the apparatus may compose the at least one first layer at the first portion of the at least one DPU and the at least one second layer at the second portion of the at least one DPU. For example, referring to FIGS. 6, at 614*a* and 614*b*, the first portion 604 of the at least one DPU may compose the at least one first layer and the second portion 606 of the at least one DPU may compose the at least one second layer. Further, 808 may be performed by the display processor 127.

In one configuration, at 802*a*, to obtain the plurality of layers, the apparatus may receive the plurality of layers from a memory or the at least one DPU. For example, referring to FIG. 6, at 608*a*, to obtain the plurality of layers, the first DPU component 602 may receive the plurality of layers from a memory or the at least one DPU. Further, 802*a* may be performed by the display processor 127.

In one configuration, the memory may be a DDR memory.

In one configuration, the at least one first layer may correspond to a first batch of layers. The at least one second layer may correspond to a second batch of layers.

In one configuration, the at least one first layer and the at least one second layer may be composed within a Vsync period.

In one configuration, the at least one first layer or the at least one second layer may be composed by a writeback hardware block in the at least one DPU.

In one configuration, at 810, the apparatus may store the composed at least one first layer and the composed at least one second layer in a memory. For example, referring to FIGS. 6, at 616*a* and 616*b*, the first portion 604 of the at least one DPU may store the composed at least one first layer in a memory and the second portion 606 of the at least one DPU may store the composed at least one second layer in a memory. Further, 810 may be performed by the display processor 127.

In one configuration, the composed at least one first layer and the composed at least one second layer may be stored in a writeback buffer of the memory.

In one configuration, at 812, the apparatus may retrieve the stored at least one first layer and the stored at least one second layer from the memory. For example, referring to FIG. 6, at 618, the first portion 604 of the at least one DPU may retrieve the stored at least one first layer and the stored at least one second layer from the memory. Further, 812 may be performed by the display processor 127.

At 814, the apparatus may transmit the retrieved at least one first layer and the retrieved at least one second layer to a display. For example, referring to FIG. 6, at 620, the first portion 604 of the at least one DPU may transmit the retrieved at least one first layer and the retrieved at least one second layer to a display. Further, 814 may be performed by the display processor 127.

In one configuration, the at least one DPU may include at least two DPUs.

In one configuration, a first display interface of the first portion of the at least one DPU may be enabled. A second display interface of the second portion of the at least one DPU may be disabled.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus may include means for obtaining a plurality of layers associated with at least one frame in a scene. The apparatus may further include means for identifying a composition capability of a first portion of at least one DPU and a second portion of the at least one DPU. The apparatus may further include means for allocating at least one first layer of the plurality of layers to the first portion of the at least one DPU and at least one second layer of the plurality of layers to the second portion of the at least one DPU. The at least one first layer and the at least one second layer may be allocated based on the composition capability of the first portion and the second portion. The apparatus may further include means for composing the at least one first layer at the first portion of the at least one DPU and the at least one second layer at the second portion of the at least one DPU.

In one configuration, the means for obtaining the plurality of layers may be further configured to receive the plurality of layers from a memory or the at least one DPU. In one configuration, the memory may be a DDR memory. In one configuration, the at least one first layer may correspond to a first batch of layers. The at least one second layer may correspond to a second batch of layers. In one configuration, the at least one first layer and the at least one second layer may be composed within a Vsync period. In one configuration, the at least one first layer or the at least one second layer may be composed by a writeback hardware block in the at least one DPU. In one configuration, the apparatus may further include means for storing the composed at least one first layer and the composed at least one second layer in a memory. In one configuration, the composed at least one first layer and the composed at least one second layer may be stored in a writeback buffer of the memory. In one configuration, the apparatus may further include means for retrieving the stored at least one first layer and the stored at least one second layer from the memory. The apparatus may further include means for transmitting the retrieved at least one first layer and the retrieved at least one second layer to a display. In one configuration, the at least one DPU may include at least two DPUs. In one configuration, a first display interface of the first portion of the at least one DPU may be enabled. A second display interface of the second portion of the at least one DPU may be disabled.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of display processing, including: obtaining a plurality of layers associated with at least one frame in a scene; identifying a composition capability of a first portion of at least one DPU and a second portion of the at least one DPU; allocating at least one first layer of the plurality of layers to the first portion of the at least one DPU and at least one second layer of the plurality of layers to the second portion of the at least one DPU, the at least one first layer and the at least one second layer being allocated based on the composition capability of the first portion and the second portion; and composing the at least one first layer at the first portion of the at least one DPU and the at least one second layer at the second portion of the at least one DPU.

Aspect 2 may be combined with aspect 1 and includes that obtaining the plurality of layers includes: receiving the plurality of layers from a memory or the at least one DPU.

Aspect 3 may be combined with aspect 2 and includes that the memory is a DDR memory.

Aspect 4 may be combined with any of aspects 1-3 and includes that the at least one first layer corresponds to a first batch of layers and the at least one second layer corresponds to a second batch of layers.

Aspect 5 may be combined with any of aspects 1-4 and includes that the at least one first layer and the at least one second layer are composed within a Vsync period.

Aspect 6 may be combined with any of aspects 1-5 and includes that the at least one first layer or the at least one second layer are composed by a writeback hardware block in the at least one DPU.

Aspect 7 may be combined with any of aspects 1-6 and further includes: storing the composed at least one first layer and the composed at least one second layer in a memory.

Aspect 8 may be combined with aspect 7 and includes that the composed at least one first layer and the composed at least one second layer are stored in a writeback buffer of the memory.

Aspect 9 may be combined with any of aspects 7 and 8 and further includes: retrieving the stored at least one first layer and the stored at least one second layer from the memory; and transmitting the retrieved at least one first layer and the retrieved at least one second layer to a display.

Aspect 10 may be combined with any of aspects 1-9 and includes that the at least one DPU includes at least two DPUs.

Aspect 11 may be combined with any of aspects 1-10 and includes that a first display interface of the first portion of the at least one DPU is enabled, and a second display interface of the second portion of the at least one DPU is disabled.

Aspect 12 is an apparatus for display processing including at least one processor coupled to a memory and configured to implement a method as in any of aspects 1-11.

Aspect 13 may be combined with aspect 12 and includes that the apparatus is a wireless communication device.

Aspect 14 may be combined with aspect 13 and further includes at least one of an antenna or a transceiver coupled to the at least one processor.

Aspect 15 is an apparatus for display processing including means for implementing a method as in any of aspects 1-11.

Aspect 16 is a computer-readable medium storing computer executable code, the code when executed by at least one processor causes the at least one processor to implement a method as in any of aspects 1-11.

Various aspects have been described herein. These and other aspects are within the scope of the following claims.

What is claimed is:

1. An apparatus for display processing, comprising:
- a memory; and
- at least one processor coupled to the memory and configured to:
  - obtain a plurality of layers associated with at least one frame in a scene;
  - identify a composition capability of a first portion of at least one display processing unit (DPU) and a second portion of the at least one DPU;
  - allocate at least one first layer of the plurality of layers to the first portion of the at least one DPU and at least one second layer of the plurality of layers to the second portion of the at least one DPU, the at least one first layer and the at least one second layer being allocated based on the composition capability of the first portion and the second portion; and
  - compose the at least one first layer at the first portion of the at least one DPU and the at least one second layer at the second portion of the at least one DPU, wherein a source surface processor pipe (SSPP) associated with the at least one DPU is associated with two different display nodes.

2. The apparatus of claim 1, wherein to obtain the plurality of layers, the at least one processor is configured to receive the plurality of layers from a first memory or the at least one DPU.

3. The apparatus of claim 2, wherein the first memory is a double data rate (DDR) memory.

4. The apparatus of claim 1, wherein the at least one first layer corresponds to a first batch of layers and the at least one second layer corresponds to a second batch of layers.

5. The apparatus of claim 1, wherein the at least one first layer and the at least one second layer are composed within a vertical synchronization ($V_{sync}$) period.

6. The apparatus of claim 1, wherein the at least one first layer or the at least one second layer are composed by a writeback hardware block in the at least one DPU.

7. The apparatus of claim 1, the at least one processor being further configured to:
- store the composed at least one first layer and the composed at least one second layer in a first memory.

8. The apparatus of claim 7, wherein the composed at least one first layer and the composed at least one second layer are stored in a writeback buffer of the memory.

9. The apparatus of claim 7, the at least one processor being further configured to:
- retrieve the stored at least one first layer and the stored at least one second layer from the memory; and
- transmit the retrieved at least one first layer and the retrieved at least one second layer to a display.

10. The apparatus of claim 1, wherein the at least one DPU includes at least two DPUs respectively associated with the two different display nodes.

11. The apparatus of claim 1, wherein a first display interface of the first portion of the at least one DPU is enabled, and a second display interface of the second portion of the at least one DPU is disabled.

12. The apparatus of claim 1, further including at least one of an antenna or a transceiver coupled to the at least one processor, wherein the apparatus is a wireless communication device.

13. A method of display processing, comprising:
- obtaining a plurality of layers associated with at least one frame in a scene;
- identifying a composition capability of a first portion of at least one display processing unit (DPU) and a second portion of the at least one DPU;
- allocating at least one first layer of the plurality of layers to the first portion of the at least one DPU and at least one second layer of the plurality of layers to the second portion of the at least one DPU, the at least one first layer and the at least one second layer being allocated based on the composition capability of the first portion and the second portion; and
- composing the at least one first layer at the first portion of the at least one DPU and the at least one second layer at the second portion of the at least one DPU, wherein a source surface processor pipe (SSPP) associated with the at least one DPU is associated with two different display nodes.

14. The method of claim 13, wherein obtaining the plurality of layers comprises:
- receiving the plurality of layers from a memory or the at least one DPU.

15. The method of claim 14, wherein the memory is a double data rate (DDR) memory.

16. The method of claim 13, wherein the at least one first layer corresponds to a first batch of layers and the at least one second layer corresponds to a second batch of layers.

17. The method of claim 13, wherein the at least one first layer and the at least one second layer are composed within a vertical synchronization ($V_{sync}$) period.

18. The method of claim 13, wherein the at least one first layer or the at least one second layer are composed by a writeback hardware block in the at least one DPU.

19. The method of claim 13, further comprising:
- storing the composed at least one first layer and the composed at least one second layer in a memory.

20. The method of claim 19, wherein the composed at least one first layer and the composed at least one second layer are stored in a writeback buffer of the memory.

21. The method of claim 19, further comprising:
- retrieving the stored at least one first layer and the stored at least one second layer from the memory; and
- transmitting the retrieved at least one first layer and the retrieved at least one second layer to a display.

22. The method of claim 13, wherein the at least one DPU includes at least two DPUs respectively associated with the two different display nodes.

23. The method of claim 13, wherein a first display interface of the first portion of the at least one DPU is enabled, and a second display interface of the second portion of the at least one DPU is disabled.

24. A non-transitory computer-readable medium storing computer executable code, the code when executed by at least one processor, causes the at least one processor to:

obtain a plurality of layers associated with at least one frame in a scene;

identify a composition capability of a first portion of at least one display processing unit (DPU) and a second portion of the at least one DPU;

allocate at least one first layer of the plurality of layers to the first portion of the at least one DPU and at least one second layer of the plurality of layers to the second portion of the at least one DPU, the at least one first layer and the at least one second layer being allocated based on the composition capability of the first portion and the second portion; and compose the at least one first layer at the first portion of the at least one DPU and the at least one second layer at the second portion of the at least one DPU, wherein a source surface processor pipe (S SPP) associated with the at least one DPU is associated with two different display nodes.

25. The computer-readable medium of claim 24, wherein the code that causes the at least one processor to obtain the plurality of layers causes the at least one processor to: receive the plurality of layers from a memory or the at least one DPU.

26. The computer-readable medium of claim 25, wherein the memory is a double data rate (DDR) memory.

27. The computer-readable medium of claim 24, wherein the at least one first layer corresponds to a first batch of layers and the at least one second layer corresponds to a second batch of layers.

28. The computer-readable medium of claim 24, wherein the at least one first layer and the at least one second layer are composed within a vertical synchronization ($V_{sync}$) period.

29. The computer-readable medium of claim 24, wherein the at least one first layer or the at least one second layer are composed by a writeback hardware block in the at least one DPU.

30. The computer-readable medium of claim 24, further comprising code that causes the at least one processor to:

store the composed at least one first layer and the composed at least one second layer in a memory.

* * * * *